United States Patent
Hidaka et al.

(10) Patent No.: US 8,179,904 B2
(45) Date of Patent: May 15, 2012

(54) PACKET TRANSFER DEVICE AND TRANSFER CONTROL METHOD THEREOF

(75) Inventors: Minoru Hidaka, Kunitachi (JP); Yoshifumi Atarashi, Kawasaki (JP)

(73) Assignee: Alaxala Networks Corporation, Kanagawa (JP)

( * ) Notice: Subject to any disclaimer, the term of this patent is extended or adjusted under 35 U.S.C. 154(b) by 604 days.

(21) Appl. No.: 11/207,709

(22) Filed: Aug. 22, 2005

(65) Prior Publication Data

US 2006/0209853 A1 Sep. 21, 2006

(30) Foreign Application Priority Data

Mar. 16, 2005 (JP) ................. 2005-074250

(51) Int. Cl.
*H04L 12/56* (2006.01)
(52) U.S. Cl. ........................ 370/401; 709/239
(58) Field of Classification Search .................. 370/401, 370/395, 392, 352; 709/239, 240
See application file for complete search history.

(56) References Cited

U.S. PATENT DOCUMENTS

| | | | |
|---|---|---|---|
| 6,714,544 B1 * | 3/2004 | Bosloy et al. | 370/395.1 |
| 6,785,751 B1 * | 8/2004 | Connor | 710/52 |
| 7,328,267 B1 * | 2/2008 | Bashyam et al. | 709/227 |
| 7,337,233 B2 | 2/2008 | Dillon | |
| 2001/0048670 A1 * | 12/2001 | Kelly et al. | 370/316 |
| 2005/0025150 A1 * | 2/2005 | Helmy et al. | 370/392 |
| 2005/0060535 A1 * | 3/2005 | Bartas | 713/154 |

FOREIGN PATENT DOCUMENTS

JP 2003-032295 7/2001

OTHER PUBLICATIONS

"Transmission Control Protocol", DARPA Internet Program Protocol Specification, Sep. 1981, http://www.ietf.org/rfc/rfc0793.txt?number=793,pp. i-111, and 1-85.
W. Stevens, "TCP/IP Illustrated", vol. 1 Addison-Wesley Professional Computing Series, Dec. 1993.
Tutomu Murase et al., "TCP Overlay Network Architecture", NEC Corporation, In Japanese, 2002.

(Continued)

*Primary Examiner* — Robert Wilson
*Assistant Examiner* — Wei Zhao
(74) *Attorney, Agent, or Firm* — Stites & Harbison, PLLC; Juan Carlos A. Marquez, Esq.

(57) ABSTRACT

A first issue is to provide a packet transfer device for identifying a connection such as a TCP connection linked to a bandwidth control means, and provide a proxy acknowledgment for each identified connection such as TCP. A second issue is to provide a packet transfer device for providing a proxy acknowledgment for a connection such as TCP, and capable of improving throughput such as for TCP just by being installed at a network edge section connected to the communication terminal. As a means to resolve the first issue, a packet transfer device is provided that contains a means for identifying flows such as TCP flows for deciding if the proxy acknowledgment means requires proxy acknowledgment or not, based on the bandwidth conformance flow reported from the bandwidth control means. As a means to resolve the second issue, a packet transfer device is provided that contains a means for converting stored packets to a protocol that does make a proxy acknowledgment, and a means for transmitting the converted packets to a packet transfer device installed on the network edge oriented towards the oncoming packets.

13 Claims, 15 Drawing Sheets

OTHER PUBLICATIONS

Ichinoshin Maki et al., "Performance Analysis of TCP Proxy Mechanism in TCP Overlay Networks", The Institute of Electronics, Information and Communication Engineers, Technical Report of IEICE (Feb. 2002), pp. 7-12.

R. Stewart et al., "Stream Control Transmission Protocol", Network Working Group, Standards Track, Oct. 2000, pp. 1-118.

Tutomu Murase et al., "TCP Overlay Network Architecture", NEC Corporation, In Japanese, p. 209, and English translation, pp. 1-5, 2002.

Ichinoshin Maki et al., "Performance Analysis of TCP Proxy Mechanism in TCP Overlay Networks", The Institute of Electronics, Information and Communication Engineers, Technical Report of IEICE (Feb. 2004), pp. 7-12, and English translation, pp. 1-32.

* cited by examiner

FIG.8

| PREAMBLE/SFD | DESTINATION MAC ADDRESS | SOURCE ADDRESS | TYPE |
|---|---|---|---|

FIG.9

← 32 BITS →

20 BYTES

| VERSION | HEADER LENGTH | ToS (8 BITS) | TOTAL LENGTH | |
|---|---|---|---|---|
| IDENTIFICATION | | | FLAGS | FRAGMENT OFFSET |
| TTL | | PROTOCOL (8 BITS) | HEADER CHECKSUM | |
| SOURCE IP ADDRESS | | | | |
| DESTINATION IP ADDRESS | | | | |

FIG.10

← 32 BITS →

40 BYTES

| VERSION | CLASS (8 BIT) | FLOW LABEL | |
|---|---|---|---|
| PAYLOAD LENGTH | | NEXT HEADER No. (8 BIT) | HOP LIMIT |
| SOURCE IP ADDRESS (128 BIT) | | | |
| DESTINATION IP ADDRESS (128 BIT) | | | |

FIG.14

| FLOW No. | FLOW IDENTIFYING CONDITIONS | | | | | |
|---|---|---|---|---|---|---|
| | SOURCE IP ADDRESS (1001) | DESTINATION IP ADDRESS (1002) | UPPER PROTOCOL (1003) | TOS (1004) | SOURCE PORT No. (1005) | DESTINATION PORT No. (1006) |
| FLOW 1 | IP_S1 | IP_T1 | TCP | TOS1 | SPRT1 | DPRT1 |
| FLOW 2 | IP_S1 | IP_T3 | TCP | TOS1 | SPRT1 | DPRT3 |

FIG.15

| ENTRY No. (1501) | ACKNOWLEDGMENT PROXY PERMIT TABLE (1502) | | | | | | |
|---|---|---|---|---|---|---|---|
| | SOURCE IP ADDRESS | DESTINATION IP ADDRESS | UPPER PROTOCOL | TOS | SOURCE PORT No. | DESTINATION PORT No. | OTHER INFORMATION |
| f1 | IP_S1 | IP_T1 | TCP | * | SPRT1 | DPRT1 | * |
| f2 | IP_S1 | IP_T3 | TCP | * | SPRT1 | DPRT3 | * |
| f12 | * | * | TCP | * | * | * | * |
| ⋮ | ⋮ | ⋮ | ⋮ | ⋮ | ⋮ | ⋮ | ⋮ |

| ENTRY No. (1501) | SEARCH RESULTS (1503) | | | | |
|---|---|---|---|---|---|
| | RESPONSE PROXY | STATISTIC COLLECTION | INPUT BAND DECISION | OUTPUT BAND DECISION | OTHER INFORMATION |
| f1 | 0 | 1 | 0 | 0 | ... |
| f2 | 0 | 1 | 0 | 0 | ... |
| f12 | 1 | 1 | 0 | 0 | ... |
| ⋮ | ⋮ | ⋮ | ⋮ | ⋮ | |

FIG.16

ACKNOWLEDGMENT PROXY DISCARD TABLE
1600 1601 1602

| ENTRY No. | ACKNOWLEDGMENT PROXY DISCARD TABLE ||||||||
|---|---|---|---|---|---|---|---|
| | SOURCE IP ADDRESS | DESTINATION IP ADDRESS | UPPER PROTOCOL | TOS | SOURCE PORT No. | DESTINATION PORT No. | OTHER INFORMATION |
| f1 | IP_S1 | * | TCP | * | * | DPRT1 | * |
| f2 | * | IP_T3 | TCP | * | SPRT1 | DPRT3 | * |
| f12 | * | * | TCP | * | * | * | * |
| ⋮ | ⋮ | ⋮ | ⋮ | ⋮ | ⋮ | ⋮ | ⋮ |

1600 1601 1603

| ENTRY No. | SEARCH RESULTS |||||
|---|---|---|---|---|---|
| | RESPONSE PROXY | STATISTIC COLLECTION | INPUT BAND DECISION | OUTPUT BAND DECISION | OTHER INFORMATION |
| f1 | 0 | 1 | 0 | 0 | ... |
| f2 | 0 | 1 | 0 | 0 | ... |
| f12 | 1 | 1 | 0 | 0 | ... |
| ⋮ | ⋮ | ⋮ | ⋮ | ⋮ | |

FIG.17

TCP BUFFER CONTROL TABLE 1700, 1701, 1702

| ENTRY No. | FLOW IDENTIFYING CONDITIONS | | | | | | |
|---|---|---|---|---|---|---|---|
| | SOURCE IP ADDRESS | DESTINATION IP ADDRESS | UPPER PROTOCOL | TOS | SOURCE PORT No. | DESTINATION PORT No. | OTHER INFORMATION |
| f1 | IP_S1 | IP_T1 | TCP | * | SPRT1 | DPRT1 | * |
| f2 | IP_S1 | IP_T3 | TCP | * | SPRT1 | DPRT3 | * |
| f12 | * | * | TCP | * | * | * | * |
| ⋮ | ⋮ | ⋮ | ⋮ | ⋮ | ⋮ | ⋮ | ⋮ |

1700, 1701, 1703

| ENTRY No. | SEARCH RESULTS | | | | |
|---|---|---|---|---|---|
| | TCP BUFFER ADDRESS | RESPONSE PROXY | STOP PROXY | BUFFER QT'Y | OTHER INFORMATION |
| f1 | 0 | 0 | 0 | 1 | ... |
| f2 | 1001 | 0 | 0 | 2 | ... |
| f12 | 2001 | 1 | 0 | 1 | ... |
| ⋮ | ⋮ | ⋮ | ⋮ | ⋮ | |

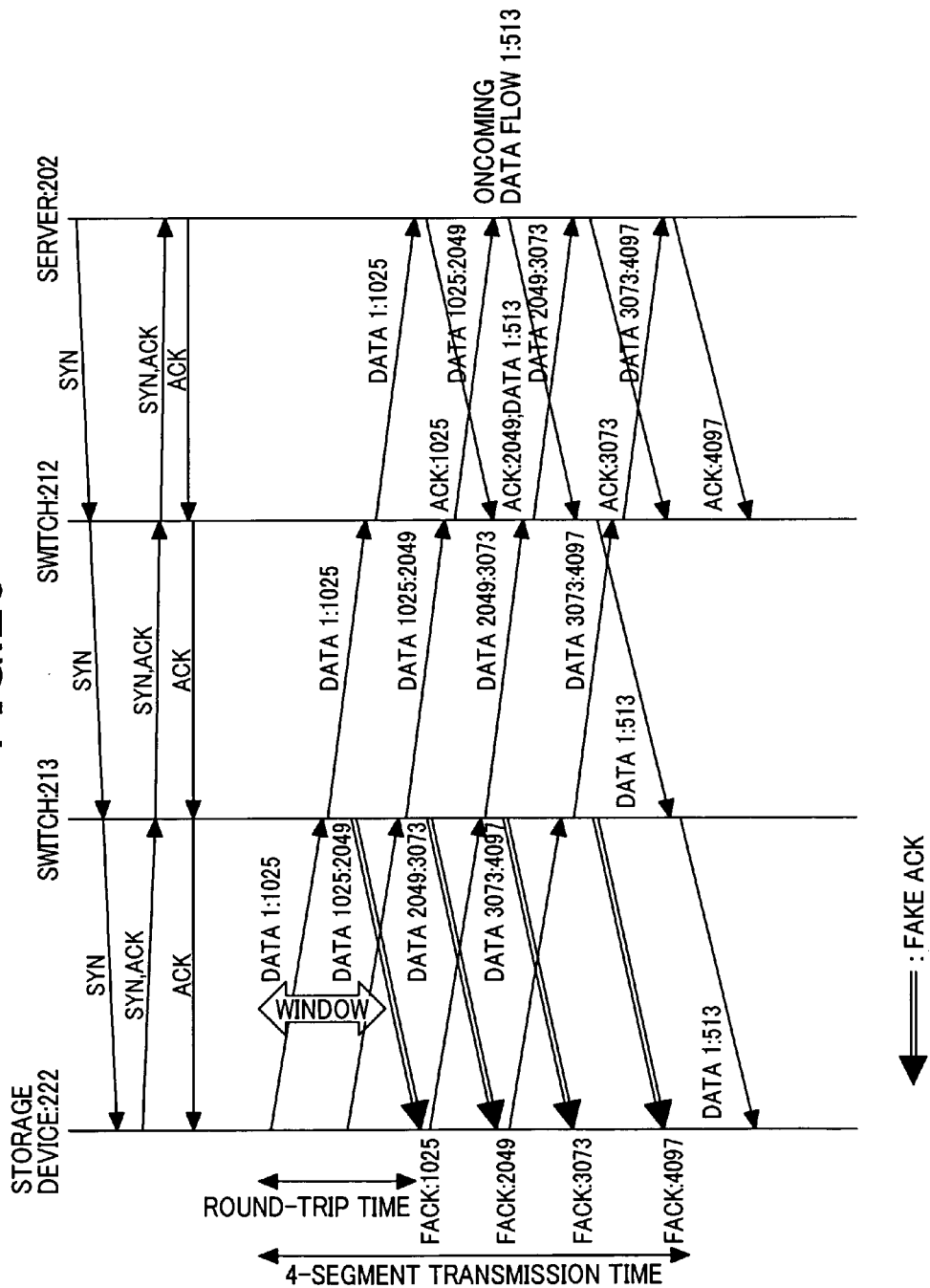

FIG.21

PROTOCOL CHANGE FLOW IDENTIFIER 2100 2101

PROTOCOL CHANGE FLOW IDENTIFIER TABLE 2102

| ENTRY No. | SOURCE IP ADDRESS | DESTINATION IP ADDRESS | UPPER PROTOCOL | TOS | SOURCE PORT No. | DESTINATION PORT No. | OTHER INFORMATION |
|---|---|---|---|---|---|---|---|
| f1 | IP_S1 | * | TCP | * | * | DPRT1 | * |
| f2 | * | IP_T3 | TCP | * | SPRT1 | DPRT3 | * |
| f12 | IP_S2 | IP_S1 | UDP | * | SPRT3 | SPRT1 | * |
| ..... | ..... | ..... | ..... | ..... | ..... | ..... | ..... |

2100 2101

SEARCH RESULTS 2103

| ENTRY No. | RESPONSE PROXY | STATISTIC COLLECTION | SOURCE IP ADDRESS | DESTINATION IP ADDRESS | UPPER PROTOCOL | TOS | SOURCE PORT No. | DESTINATION PORT No. | OTHER INFORMATION |
|---|---|---|---|---|---|---|---|---|---|
| f1 | 1 | 1 | IP_S1 | IP_S2 | UDP | * | SPRT3 | DPRT1 | * |
| f2 | 1 | 0 | IP_S2 | IP_S1 | UDP | * | SPRT1 | DPRT3 | * |
| f12 | 0 | 1 | * | * | TCP | * | * | * | * |
| ..... | ..... | ..... | ..... | ..... | ..... | ..... | ..... | ..... | ..... |

…

PACKET TRANSFER DEVICE AND TRANSFER CONTROL METHOD THEREOF

CLAIM OF PRIORITY

The present application claims priority from Japanese application JP 2005-074250 filed on Mar. 16, 2005, the content of which is hereby incorporated by reference into this application.

FIELD OF THE INVENTION

The present invention relates to packet transfer devices making up a network and a packet transfer control method for that device, and relates in particular to a packet transfer device and a packet transfer control method utilizing protocol header information for a packet transfer control method conforming with transfer control methods requiring an acknowledgment such as TCP (Transmission Control Protocol) (See non-patent document 1.) SCTP (Stream Control Transmission Protocol) (See non-patent document 5) in transfer control methods for packet transfer devices.

BACKGROUND OF THE INVENTION

The application range of networks configured by the Ethernet (Ethernet is a registered commercial trademark.) is expanding and is starting to be applied to storage area networks (SAN). Moreover, data transfer is performed at increasingly high speeds by data transfer standards such as Gigabit Ethernet and 10 Gigabit Ethernet, etc. However, the problem of attaining an effective data transfer speed has arisen due to limits on protocols (hereafter TCP, etc.) such as TCP and SCTP that require an acknowledgment.

Operating specifications such as for TCP are described in non-patent document 2 or in non-patent document 5. The operation for establishing a TCP connection and the data transfer status operation are described here.

The exchange method for TCP control information and packet exchange in the TCP connections among communication terminals conforming to TCP are shown in FIG. 3. An example where a server 201 and a storage device 221 are communicating is described.

The server 201 sends a packet (SYN packet) set with SYN flags for TCP, to the storage device 221 as a connection request.

The storage device 221 receives the SYN packet from the server as an acknowledgment, and sends a packet (ACK packet) set with an ACK flag, to the server 201. The storage device 221 simultaneously sets a SYN flag in that ACK packet, as a connection request from the storage device 221 to the server 201. The server 201 here sends the ACK packet to the storage device 221 as an acknowledgment confirming that SYN packet from the storage device 221 was received, and establishes a TCP connection.

The server 201 and the storage device 221 shift to data transfer state when the TCP connection is established. In this data state, the transmit sections of the communication terminals send data to each other, and the receive sections utilize ACK packets as an acknowledgment confirming arrival of the data. For the purpose of simplicity, only the sending of data from the storage device 221 to the server 201 is described in the example related here.

In communication with TCP, the side sending the data (in this case, storage device 221) must standby until an acknowledgment is received, before it can send the next data. Therefore the round-trip time (RTT) which is the difference between the data transmission time and acknowledgment arrival time, is a factor in determining the upper threshold of transmit speed for the data to be sent. The quantity of data that can be transmitted in advance of the arrival of the acknowledgment is called the window. This window is also a factor in determining the upper threshold of transmit speed for data to be sent.

In the technology of the related art that adjusts these parameters to improve the data transfer throughput of TCP, a device is installed for relaying the connection such as TCP between the transmit terminal and the receive terminal. This device functions as a proxy for sending the acknowledgment, without waiting for an acknowledgment from the receive side, so that the RTT can be shortened and the data transfer throughput between the terminals can be improved. This technology for example, is the packet relay device disclosed in the patent document 1 and, the TCP overlay networks disclosed in non-patent document 3 and non-patent document 4.

The device for relaying the TCP connection is installed as a switch or router on the network. The acknowledgment performed by proxy by the switch 211 is described using FIG. 4. When the TCP connection is established and the data transfer state attained, the switch 211 acting as a proxy for the server 201, sends an acknowledgment for data sent to the server 201 from the storage device 221. In this case, the storage device 221 can send data in a quantity complying with the window, without waiting for an acknowledgment from the server 201. The RTT and window are here the same as in the case of FIG. 3, however the data transfer throughput of the TCP possesses a better data transfer throughput.

The packet transfer device serving as a proxy for sending the acknowledgment to confirm the connection such as TCP is hereafter called the proxy device for TCP.

[Patent document 1] JP-A No. 32295/2003
[Non-patent document 1] J. Poste, "Transmission Control Protocol", Request for Comments 793, 1981
[Non-patent document 2] W. Stevens, "TCP/IP Illustrated, Volume 1: The Protocols", Addison-Wesley, 1994
[Non-patent document 3] Tsutomu Murase, Hideyuki Shimonishi, Yohei Hasegawa, "Proposal for TCP Overlay Network", Society of IEEE general meeting, 2002.
[Non-patent document 4] Ichinoshin Maki, Takeshi Hasegawa, Masayuki Murata Tsutomu Murase, "Performance Analysis of TCP Connection Segment Mechanisms on TCP Overlay Networks", IEEE, IN03-198, 2004.
[Non-patent document 5] R. Stewart, Q. Xie, K. Morneault, C. Sharp, H. Schwarzbauer, T. Taylor, I. Rytina, M. Kalla, L. Zhang V. Paxon, "Stream Control Transmission Protocol", Request for Comments 2960, 2000.

SUMMARY OF THE INVENTION

In the packet transfer device of the related art, the packets passing through are processed in their order of arrival at the connection such as TCP where the proxy acknowledgment is made. However in the related art, there was no effective means for selecting the flow (Hereafter, a packet group whose source and destination are the same, and where identical file data are divided is called a flow.) among a group of packets requiring a proxy acknowledgment. Devices where flows were concentrated such as routers and switches installed on the network were incapable of processing all the flows since there were limits on the capacity of the storage (memory) means and the flow processing capacity, etc.

Therefore a first problem to be resolved by this invention is providing a proxy device (for TCP etc.) capable of selecting from among multiple flows, a flow for making a proxy acknowledgment, and making an acknowledgment with no loss of throughput in processing on a network interface such as Gigabit Ethernet, etc.

The method of the TCP proxy device of the related art for subdividing TCP connections and subdividing the RTT of the TCP required the installation of a TCP proxy device for subdividing the RTT between the communication terminals, in order to obtain a maximum effect from the TCP proxy device. Though comparatively easy to install at edge sections of the network, these devices were in fact, difficult to install at positions where needed within the network.

A second problem to be resolved by this invention is providing a proxy device (for TCP etc.) capable of improving the throughput such as with TCP by installing the device at network edge sections.

As a means to resolve the first problem, this invention provides a flow identifier means for determining if the acknowledgment proxy transmit means is required for making a proxy acknowledgment, based on bandwidth conformance flow identifier results reported by the bandwidth control means, in a packet transfer device including a packet bandwidth control means and a storage means for storing transfer packets, and acknowledgment proxy transmit means and analysis means for packet data in packets stored in the storage means.

As a means to resolve the second problem, this invention along with including a storage means for storing transfer packets in the packet transfer device, and an analysis means for analyzing packet data of packet stored in the storage means, further includes a means for converting the stored packets to protocols not performing acknowledgment such as UDP and a means for transmitting the converted packets to a proxy device (for TCP etc.) installed on an oncoming network edge for the converted packets, and a means for improving the throughput for TCP, etc.

By including the above described means, the packet transfer device of this invention can identify flows such as TCP for making a proxy acknowledgment for subdividing a connection such as TCP between the communication terminals. This invention can therefore improve the flow throughput and effectively utilize the line bandwidth.

By utilizing a communication method not requiring an acknowledgment for connections between proxy devices (for TCP etc.), the flow throughput requiring an acknowledgment such as TCP flows can be improved just by installing proxy devices (for TCP etc.) at the comparatively easy to install network edge sections.

BRIEF DESCRIPTION OF THE DRAWINGS

FIG. 8 is a drawing of the header field structure of the Ethernet v2 frame as an example of a layer 2 header;

FIG. 9 is a drawing of the header field structure of an IPv4 datagram as an example of a layer 3 header;

FIG. 10 is a drawing of the header field structure of an IPv6 datagram as an example of a layer 3 header;

FIG. 14 is a drawing of the header field structure utilized in flow selection;

FIG. 15 is a drawing showing the acknowledgment proxy permit table:

FIG. 16 is a drawing showing the acknowledgment proxy discard table;

FIG. 17 is a drawing showing an example of the TCP buffer control table structure;

FIG. 20 is a diagram of the method for exchanging packet and control information in the TCP connection for the method for improving TCP throughput in the proxy device (for TCP etc.) in this invention; and FIG. 21 is drawings showing the structure of the protocol change flow identifier table 2100.

DETAILED DESCRIPTION OF THE PRESENT INVENTION

First Embodiment

Figure 1:
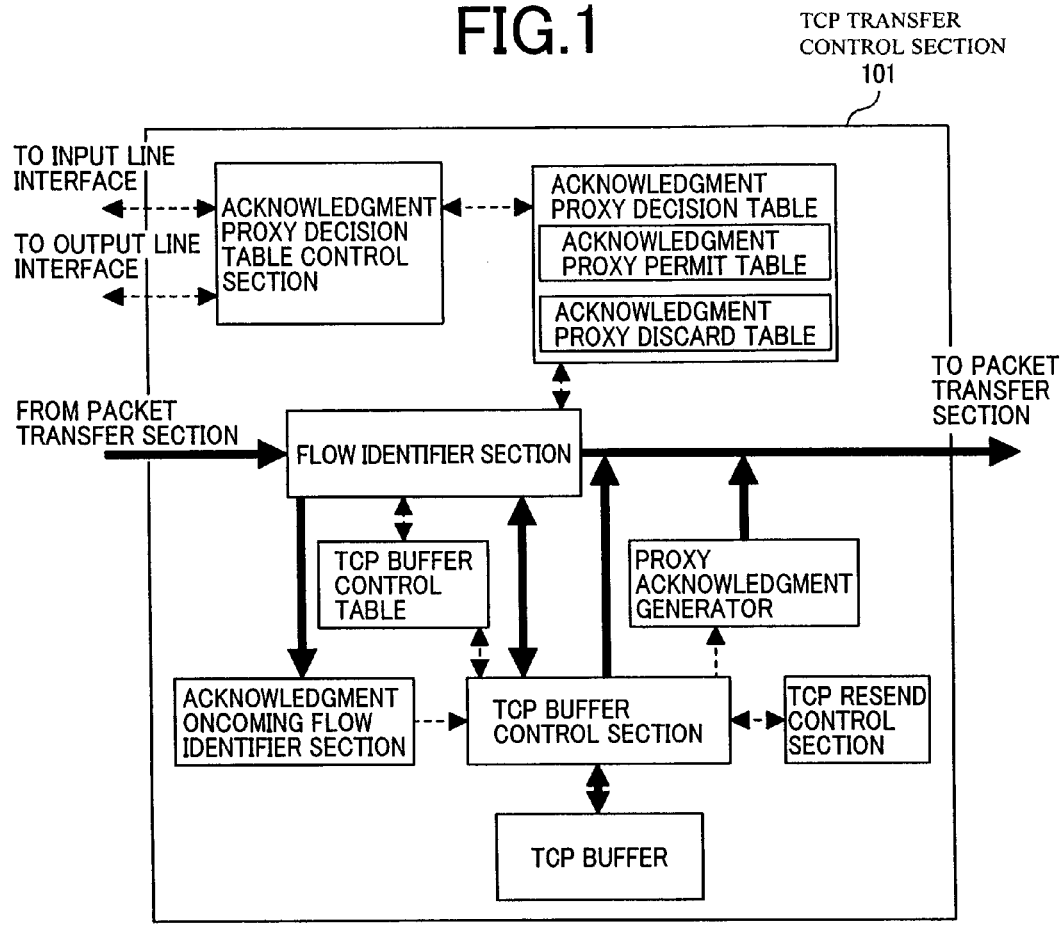
FIG. 1 is a concept block diagram showing the function block structure of the TCP transfer control section of this invention.

The first embodiment of this invention is described next while referring to the drawings. The network structure of this invention and the communication method of this invention are described first. An example is described of the case where a computer (server) such as a file server is exchanging file data with a storage device via a storage area network (SAN).

Figure 2:
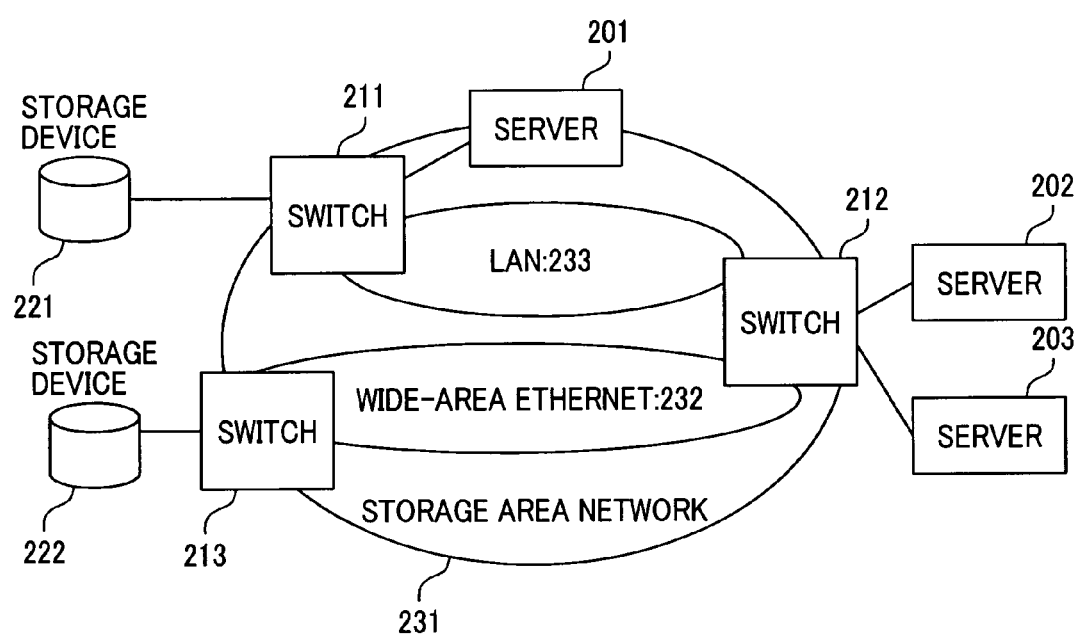
FIG. 2 is a concept view showing a network structure utilizing the packet transfer device section of this invention.
Figure 3:
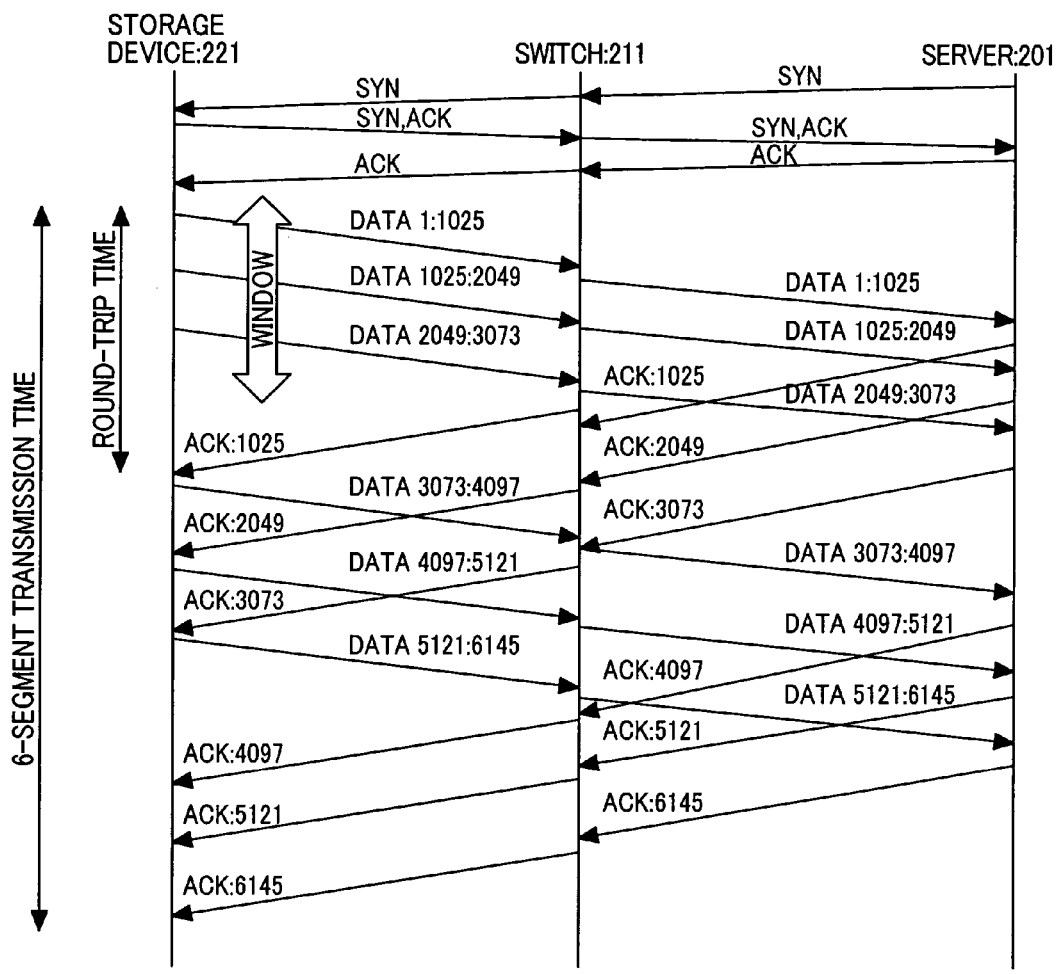
FIG. 3 is a concept diagram showing the exchange method for packet and control information in connections conforming to TCP etc.
Figure 4:
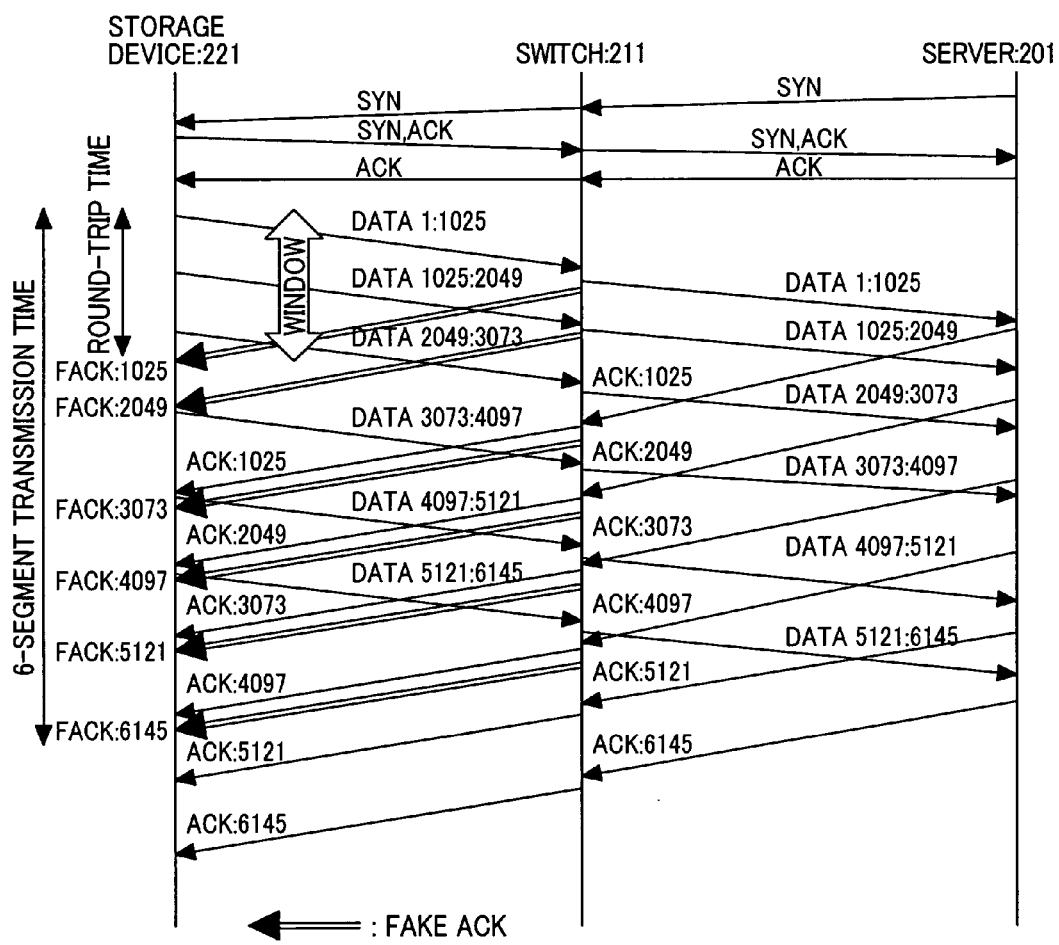
FIG. 4 is a concept diagram showing the exchange method for packet and control information in TCP connections for the improved TCP throughput method in the TCP proxy device of the related art.

FIG. 2 is a drawing showing the structure of the storage network utilizing the packet storage device. The storage device and the server are respectively connected by switches. The storage network may at this time include a wide area Ethernet.

The TCP operation when reading a file on the storage device 221 from the server 201 is described. Since the operation and structure are the same even in protocols other than TCP such as SCTP, the embodiment of this invention is described hereafter using TCP as an example.

Here, IP addresses are assumed to be assigned to respective communication terminals. In TCP, communication is performed by negotiation between communication terminals and establishing TCP connections. In this case, the term of communication terminal as used here, respectively indicates the server 201 and the storage device 221. Multiple programs for performing communications are operated (running) on the server 201 and storage device 201 that serve as the communication terminals so that a TCP port No. is assigned as an identifier to discriminate (or identify) these programs.

The TCP connection is identified by the network address (IP address) of the one of the communication terminals, and the TCP port No., and the TCP port No. and IP address of the other communication terminal.

During communication between communication terminals, when multiple packets making up one file are being sent and received from the transmit side of a communication terminal to the receive side of a communication terminal; and when these packets are TCP, then the identifier set made up of the destination IP address and source IP address and destination port and source port etc., of those packets are identical. A packet group identified from this type of destination information and source information of the communication protocol is called a flow. In this embodiment, in the case of TCP, the destination IP address and the source IP address as well as the destination port and source port with respectively interchanged flows are called oncoming flows.

The transmit side of the established TCP connection sends a TCP sequence number showing the transmit data and the transmit data quantity. The receive side sends the latest sequence number as an acknowledgment number, to the transmit side in the opposite direction in order to show the data quantity confirmed during receive. When there is an oncoming flow from the receiver side to the transmit side, the header in this reverse direction transmission include the acknowledgment number. If there is no oncoming flow then an oncoming flow possessing only the TCP header with the acknowledgment number, is generated and sent.

Figure 5:
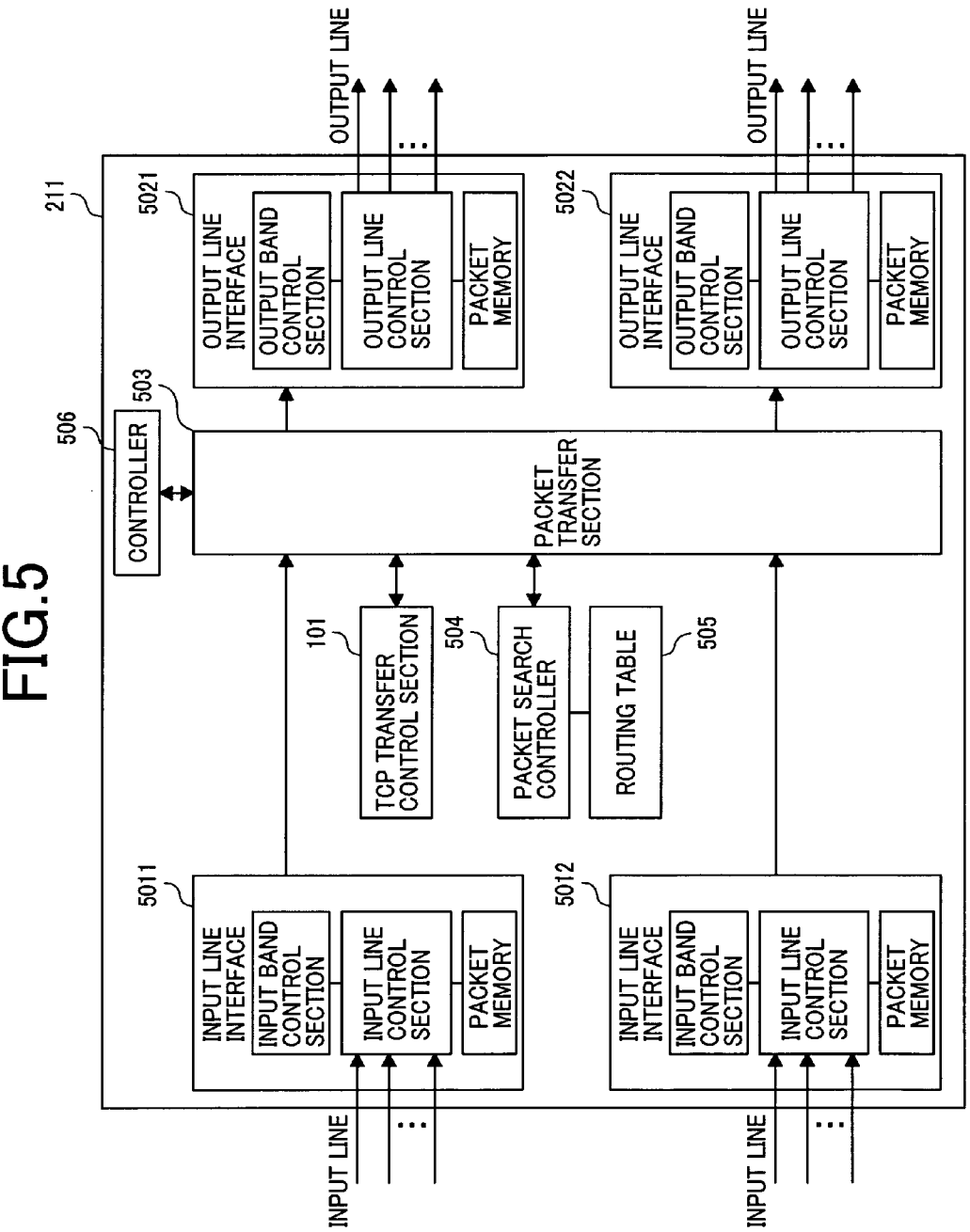
FIG. 5 is a concept block diagram showing the function block structure of the packet transfer device of this invention.

The structure of the packet transfer device required for implementing this invention is described next. FIG. 5 is a block diagram showing the function block structure of the packet transfer device of this invention. The packet transfer device of this invention contains a control section for controlling the entire device and a packet transfer section for processing to transfer the packet received on the input line interface and the output line interface, and a packet search controller linked to the packet transfer section for searching the packet destination. The packet search controller contains a path table. The packet transfer device also contains a TCP transfer control section as a packet storage means, linked to the packet transfer section.

The line interface contains a bandwidth control section. The bandwidth control section may contain either or both the input line interface and output line interface. The input bandwidth control section contains a means to record the arrival time of the received packet and monitor the bandwidth of the input line in the period from the arrival time of the packet, and can therefore notify the TCP transfer control section when the flow the packet belongs to, has exceeded the input line bandwidth setting.

The output bandwidth control section contains a means for managing the transmit time for the packet and controlling the output line bandwidth and can therefore notify the TCP transfer control section when the flow the packet belongs to, has exceeded the output line bandwidth setting.

The input line interface and the output line interface are in many cases mounted on the same board, however in this case, the functions are separated for purposes of simplicity on the flow chart for showing the packet processing.

Figure 7:
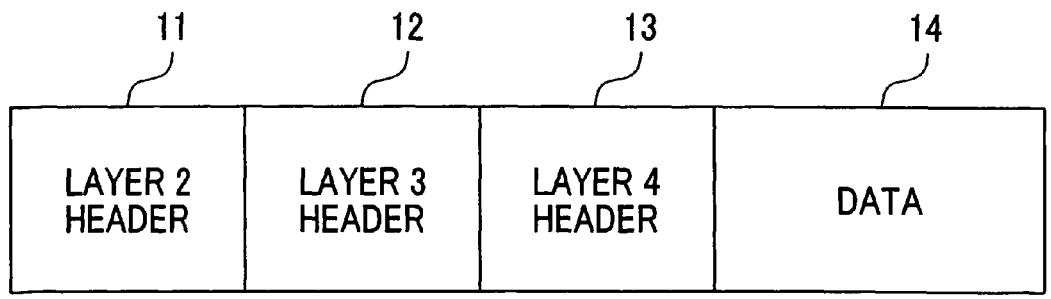
FIG. 7 is a drawing showing the packet structure utilized for communication.

FIG. 7 is a drawing showing the structure of the packet utilized for communication. The packet is made up of data and header information formed layers corresponding to each layer protocol of the OSI (Open System Interconnection) reference model. More specifically, the packet is comprised of a layer 2 header, layer 3 header, layer 4 header data, etc. Protocols such as Ethernet (Ethernet is a registered commercial trademark.), ATM (Asynchronous Transfer Mode), or MPLS (Multi-Protocol Label Switching) may be utilized as the layer 2 protocol. Protocols such as Internet Protocol version 4 (IPv4), Internet Protocol version 6 (IPv6), may be utilized as the layer 3 protocol. Protocols such as TCP (Transmission Control Protocol) and UDP (User Datagram Protocol) may be utilized as the layer 4 protocol.

FIG. 8 is a drawing of the header field structure of the Ethernet version 2 (v2) frame as an example of a layer 2 header. The Ethernet v2 frame header contains the preamble/SFD for indicating the start of the frame, MAC (Media Access Control) address (destination MAC address) for the destination terminal in layer 2, MAC address (source MAC address) for the source terminal of layer 2, and types showing protocols for layer 3, that are each defined as header fields.

FIG. 9 is a drawing showing the header field structure of an IPv4 datagram as an example of a layer 3 header. The IPv4 header contains a ToS showing the transfer quality of the packet, a protocol showing the layer 4 protocol, an IP address (source IP address) for the source terminal, and an IP address for the destination terminal (destination IP address), each defined as header fields.

FIG. 10 is a drawing of the header field structure of an IPv6 datagram as an example of a layer 3 header. The IPv6 header contains a class showing the transfer quality of the packet, the next header number showing the next header type for hierarchically storing this header, an IP address (source IP address) for the source terminal, and an IP address for the destination terminal (destination IP address), that are each defined as header fields.

Figure 11:
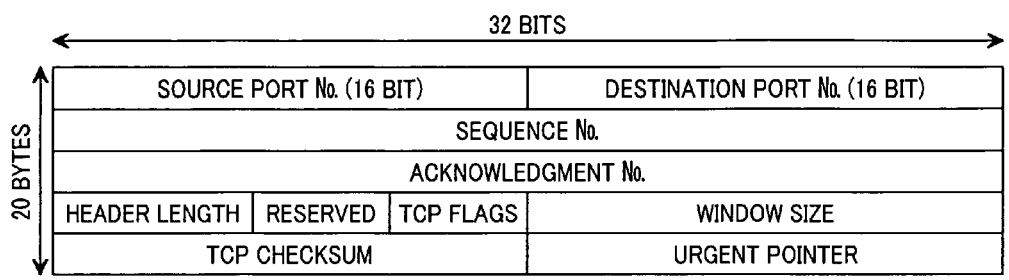
FIG. 11 is a drawing of the header field structure of the TCP segment as an example of a layer 4 header.

FIG. 11 is a drawing of the header field structure of the TCP segment as an example of a layer 4 header. The TCP header contains a source port number for identifying the TCP segment by the upper layer such as the application, a destination port number, and a TCP flag showing the TCP communication status, that are each defined as header fields.

Figure 12:
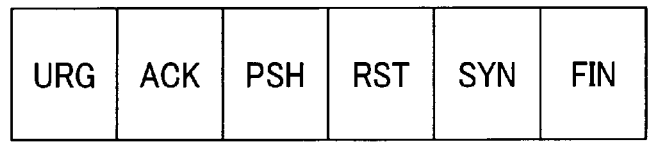
FIG. 12 is a drawing of the flag field structure of the TCP header field.

The TCP flag is shown in detail in FIG. 12. The TCP flag is made up of six flags. These six flags are an urgent (URG) flag for specifying the urgent handing over of receive data by the receive terminal to the application, the acknowledgment (ACK) flag for notifying the transmit terminal that the receive terminal has received data, and a (PUSH) flag for specifying the handing over of data by the transmit terminal and the receive terminal to the application without delay, the (RST) flag for supporting the reset of the TCP connection, a (FIN) flag for supporting the termination of the connection, and an (SYN) flag for specifying the establishing of a connection.

Figure 13:
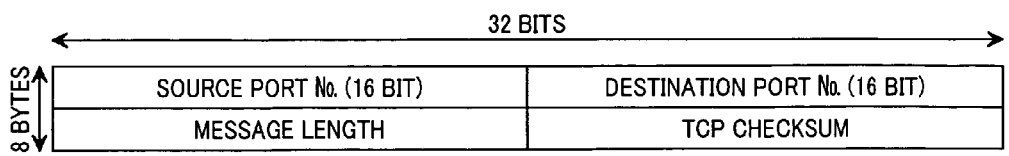
FIG. 13 is a drawing of the header field structure of the UDP segment as an example of the layer 4 header.

FIG. 13 is a drawing of the header field structure of the UDP segment as an example of the layer 4 header. The UDP header contains a source port number for identifying the UDP segment by the upper layer such as the application, a destination port number, and a checksum that are respectively defined as header fields.

FIG. 14 is a drawing showing conditions for flow identification.

In flow identification, a flow number is established for identifying the flow of a packet holding a combination of information in the layer 2 header field, the layer 3 header field and the layer 4 header field. For example, the destination MAC address, the source MAC address are utilized in the layer 2 header field, the destination IP address, the source IP address, the upper protocol, etc., are utilized in the layer 3 header field, or the destination TCP port, and source TCP port are utilized in the layer 4 header field.

In the structure shown in FIG. 14, the destination IP address, source IP address, upper protocol, destination TCP port, source TCP port are identification conditions.

FIG. 1 is a block diagram showing the structure of the TCP transfer control section of this invention.

The TCP transfer control section 101 is made up of a flow identifier section and a TCP buffer control section and a TCP buffer and TCP buffer control table and a TCP resend control section and a proxy acknowledgment generator and an proxy acknowledgment oncoming flow identifier section and an proxy acknowledgment proxy decision table control section, and an proxy acknowledgment proxy decision table.

The method for making a TCP connection acknowledgment in the packet transfer device of this invention is described while referring to FIG. 15 through FIG. 19.

The flow identifier section analyzes the header structure of the packet transferred from the packet transfer section. When a packet possessing a TCP header is input, the flow identifier section decides if it is a TCP data packet or an acknowledgment packet. A packet possessing a TCP data section is a TCP data packet. A packet possessing a valid ACK flag as the TCP flag is an acknowledgment packet.

Figure 18:
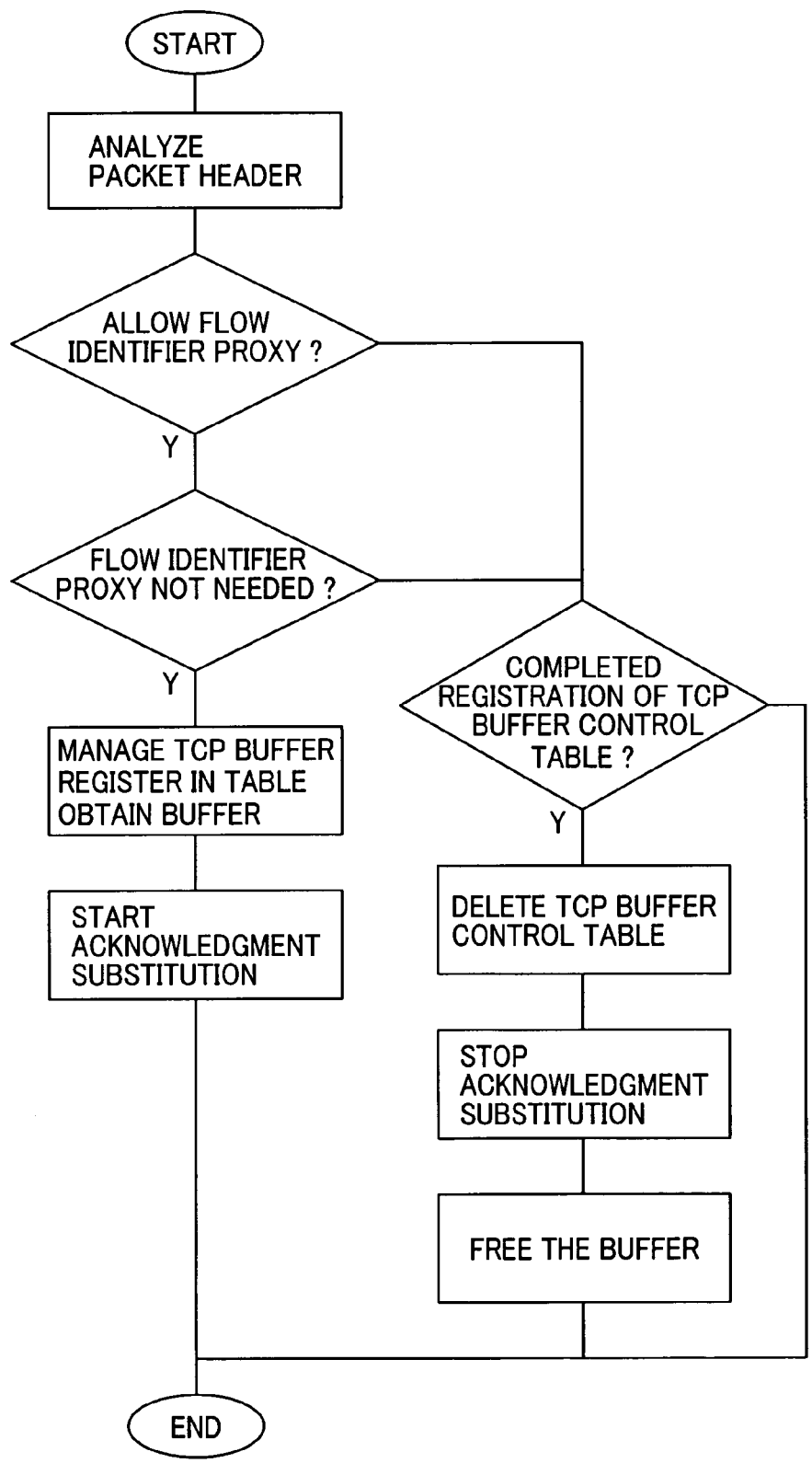
FIG. 18 is a flow chart showing an embodiment of the processing of the TCP data packets.

In the case of the TCP data packet, a decision is made whether or not a proxy acknowledgment can be made, according to the flow chart in FIG. 18.

FIG. 15 is a drawing showing the acknowledgment proxy permit table.

The flow identifier section obtains search results for section matching the header field of the TCP data packet, by comparing with values held in the acknowledgment proxy permit table of the acknowledgment control table shown in FIG. 15. The search results are set in a decision flag showing conformance to the input bandwidth, and a decision flag showing conformance to the output bandwidth. A flow conforming to the bandwidth is identified as an acknowledgment flow. A flow may also be identified as an acknowledgment flow according to the priority level of the packet TOS field.

When identifying acknowledgment flows according to the priority level of the packet TOS field, bandwidth control may be implemented by an external device connected by the lines and this device, and a structure contrived to accept those results.

A flag is also set that shows a proxy acknowledgment is needed or not, so that a decision made on whether to make a proxy acknowledgment for allowed flows or normal packet transfer for prohibited flows.

FIG. 16 is a drawing showing the acknowledgment proxy discard table.

In order to decide whether or not an unnecessary flow requires a proxy acknowledgment, the flow identifier compares the value held in the acknowledgment proxy discard table 1600 shown in FIG. 16 for a section matching the header field, and obtains the search results. A decision flag showing conformance to the input bandwidth, and a decision flag showing conformance to the output bandwidth are set in the search results in some cases. Flows not conforming (not within their bandwidth) are identified as non-proxy acknowledgment flows. Flows identified as non-proxy acknowledgment flows may be identified by the priority level of the TOS field of the packet.

When identifying acknowledgment flows according to the priority level of the packet TOS field, bandwidth control may be implemented by an external device connected by the lines and this device, and a structure contrived to accept those results.

When the TCP buffer control section checks the TCP buffer control table 1700 shown in FIG. 17 and finds that the value in the TCP buffer is lower than a preset value, the TCP buffer is then determined to be empty, the proxy acknowledgment of that packet is stopped, and that packet can then be sent by normal transfer by setting the flow the packet belong to, into the acknowledgment proxy discard table or deleting the flow that the packet belongs to, from the acknowledgment proxy permit table. If the TCP buffer is empty then the proxy acknowledgment of that packet is stopped, and that packet can then be sent by normal transfer.

When making a proxy acknowledgment for the input packet, the packet is registered in the TCP buffer control table shown in FIG. 17 and the proxy acknowledgment is started.

FIG. 17 is a drawing showing an example of the TCP buffer control table structure. The TCP buffer control section receives the packet data from packet memory within the receive line interface that was copied in the packet transfer section, stores it in the TCP buffer, and registers the packet address in the TCP buffer control table.

Normal transfer (or transmission) is decided if registered as a packet not requiring proxy. When normal transfer has been decided, the proxy acknowledgment processing of flows already registered in the TCP buffer control table is stopped, and the TCP buffer freed for use.

Figure 19:
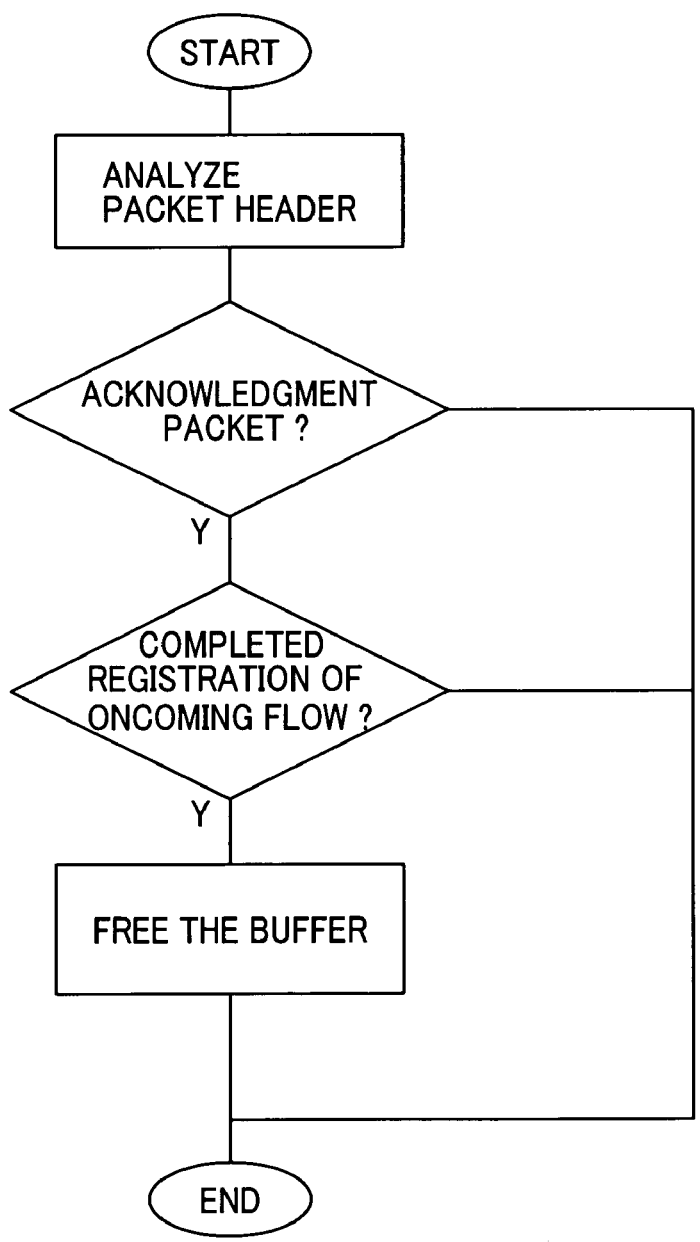
FIG. 19 is a flow chart showing an embodiment of the processing of the TCP acknowledgment packet.

In the case of an acknowledgment packet, TCP control is implemented on proxy acknowledgment flows according to the flow chart in FIG. 19.

The flow identifier section sends the acknowledgment packet to the acknowledgment identifier section. In the acknowledgment identifier section, a decision is made if the oncoming flow for the received acknowledgment packet is registered in the TCP buffer control table or not. If registered, then the packet for which a proxy acknowledgment was made, is being held in the TCP buffer so that the buffer is then freed since the acknowledgment for the TCP packet has been accepted by the TCP control section.

The packet transfer device of this invention can identify TCP flows for making a proxy acknowledgment by utilizing the means described up to now, in order to subdivide TCP connections between the server and storage device. Consequently, the line bandwidth can be effective utilized, and the TCP flow throughput can be improved on lines with extra capacity on useable bandwidths, according to those bandwidths utilizable for TCP flow and on bandwidths for network lines.

Second Embodiment

The second embodiment of this invention is described next while referring to the drawings.

In the second embodiment, an example is described for performing communication between the server 202 and the storage device 222 in a network configuration shown in FIG. 2. The communication protocol utilizes the same structure and operation as the first embodiment even if a protocol other than TCP such as SCTP is used and so TCP is hereafter used as an example in this embodiment of the invention.

Figure 6:
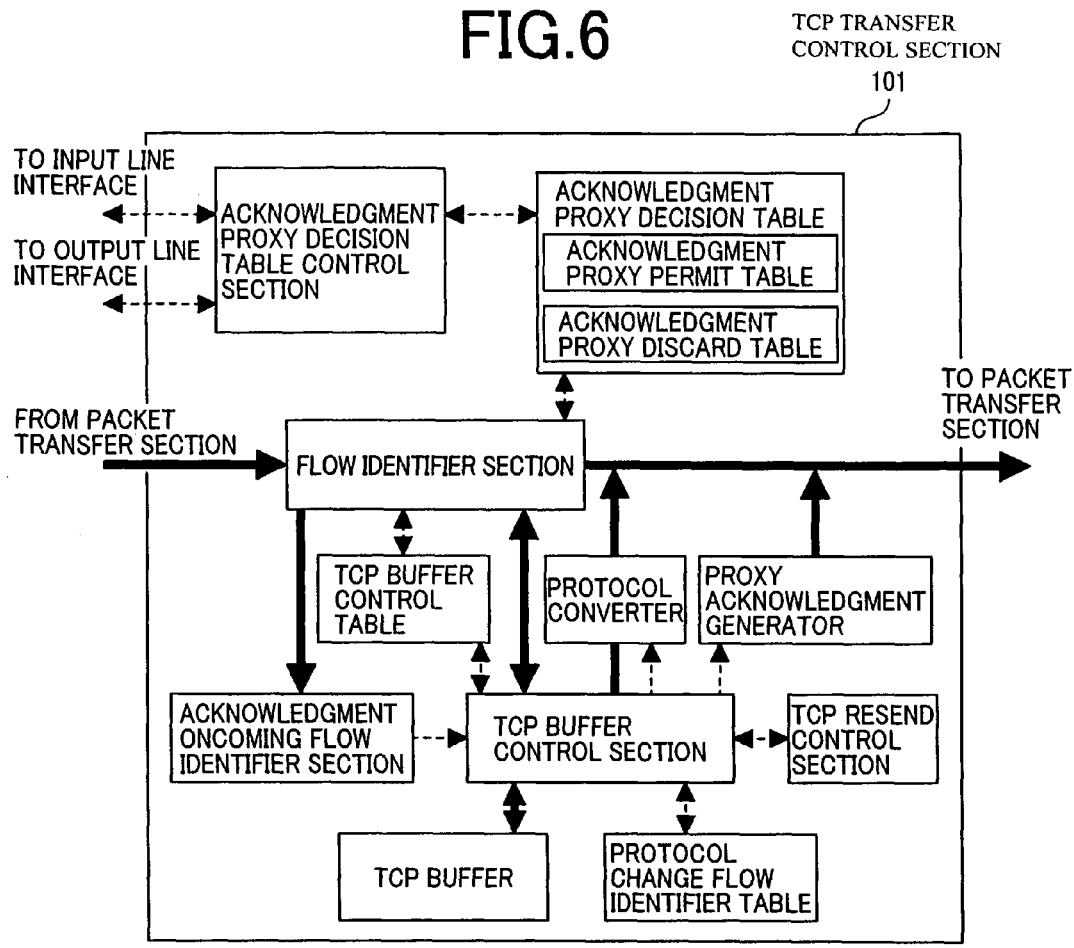
FIG. 6 is a concept block diagram showing the function block structure of the TCP transfer control section of this invention.

FIG. 6 shows another structure of the TCP transfer control section 101. In addition to the structure of FIG. 1, it contains a protocol change flow identifier table and a protocol converter.

Compared to the structure of the packet transfer device of the first embodiment, this embodiment possesses the TCP transfer controller of that shown in FIG. 6, for utilizing a UDP capsulizing process to convert packet data between TCP proxy devices.

When the server 202 has established a TCP connection with the storage device 222, the switch 212 installed on the network edge on the server 202 side, and the switch 213 installed on the network edge of the storage device 222 side can pass packets.

When the TCP connection is established, the switch 213 searches for a flow entry showing protocol conversion recorded in the flow table, for the TCP data packet and obtains packet header information from the search results for transmission to the switch 212. Further, the switch 213 attaches a new packet header to the TCP data packet from the storage device and converts it to a UDP packet, and sends it to the switch 212. Also, there is no acknowledgment from the switch 212 so the switch 213 does not register proxy acknowledgment packets into the TCP buffer. The network for sending the UDP packets from the switch 213 to the switch 212 at this time may include a means for avoiding communication errors during transmission such as by using an error correction code, etc.

By containing a communication error avoidance means, delays in data transfer due to packet losses occurring during data transfer between switches can be reduced, and high-speed data communications can be achieved.

The switch 212 searches the flow entries showing protocol conversion registered in the flow table, removes packet headers such as UDP headers attached by the switch 213, and receives TCP data packets sent by the storage device. The switch 212 registers them into the TCP buffer the same as in the first embodiment, and sends the packet for the source TCP connection (sent by the storage device serving as the TCP proxy device) to the server 202.

By possessing the means described up to now, the packet transfer device of this invention can improve the throughput of the TCP flow just by installing a TCP proxy device on the comparatively easy to install network edge, and by utilizing a communication method not requiring an acknowledgment in the TCP connection between TCP proxy devices.

This invention is one type of device control technology capable of being utilized in packet relay devices for use by communication businesses or businesses in other fields utilizing communications networks.

What is claimed is:

1. A packet transfer device comprising:
   a sorting processor unit that sorts a received packet;
   a bandwidth controller that controls a network bandwidth for receiving a packet;
   a transfer processor that processes a transfer of the received packet of a protocol requiring an acknowledgment;
   a storage unit that stores the received packet according to results of the sorting; and
   a transmitter/receiver that makes a first proxy acknowledgment for the packet stored in the storage unit and sends the first proxy acknowledgment to a source of the received packet, and that re-sends the packet to a destination of the received packet before a second acknowledgment for the packet is received from the destination of the received packet,
   wherein the sorting processor unit decides if the first proxy acknowledgment is required or not based on network bandwidth conformance flow identification results in the bandwidth controller if the second acknowledgment is not received within a specified time, and
   the transmitter/receiver makes the first proxy acknowledgment for the received packet when the sorting processor unit decides that the first proxy acknowledgment is required, and sends the first proxy acknowledgment to the source of the received packet before the second acknowledgment is received.

2. The packet transfer device according to claim 1, wherein information specifying a flow where the proxy acknowledgment is not performed is stored; and
   when deciding if the proxy acknowledgment is required or not, the sorting processor unit decides if the proxy acknowledgment is required further based on the information.

3. The packet transfer device according to claim 1, wherein information specifying a flow where the proxy acknowledgment is performed is stored; and
   when deciding if the proxy acknowledgment is required or not, the sorting processor unit decides if the proxy acknowledgment is required further based on the information.

4. A packet transfer device comprising:
   a transfer processor that processes a transfer of a received packet;
   a sorting processor unit that sorts the received packet;
   a storage unit that stores the received packet according to results of the sorting; and
   a transmitter/receiver that makes a first proxy acknowledgment for the received packet stored in the storage unit and sends the first proxy acknowledgment to a source of the received packet and that re-sends the packet to a destination of the received packet before a second acknowledgment for the packet is received from the destination of the received packet;
   wherein the received packet stored in the storage unit is to be converted to a packet of a different protocol from a protocol for the received packet and the packet is to be sent to the destination of the received packet.

5. The packet transfer device according to claim 4, wherein information specifying a flow where the proxy acknowledgment is not performed is stored; and
   when deciding if the proxy acknowledgment is required or not, the sorting processor unit decides if the proxy acknowledgment is required further based on this information.

6. The packet transfer device according to claim 4, further comprising a bandwidth controller that controls a bandwidth for the received packet,
   wherein the sorting processor unit decides if the proxy acknowledgment is required or not based on bandwidth conformance flow identification results in the bandwidth controller.

7. The packet transfer device according to claim 4, wherein information specifying a flow where the proxy acknowledgment is performed is stored; and
   when deciding if the proxy acknowledgment is required or not, the sorting processor unit decides if the proxy acknowledgment is required further based on the information.

8. The packet transfer device according to claim 1,
   wherein the bandwidth controller monitors an amount of the received packet from the source of the received packet,
   wherein the sorting processor unit decides the first proxy acknowledgment is required without the second proxy acknowledgment being received if the monitored amount of the received packet is less than a predetermined value.

9. The packet transfer device according to claim 6,
   wherein the bandwidth controller monitors an amount of the received packet from the source of the received packet,
   wherein the sorting processor unit decides the first proxy acknowledgment is required without the second proxy acknowledgment being received if the monitored amount of the received packet is less than a predetermined value.

10. The packet transfer device according to claim 1, wherein:
the transmitter/receiver further provides a connection to a network via which the received packet is received,
the bandwidth controller controls the network bandwidth corresponding to at least one of the connection.

11. The packet transfer device according to claim 4,
wherein the different protocol is UDP protocol from TCP protocol accordance to which the first acknowledgement is sent to the source of the received packet.

12. A communication device between a source node and a destination node, said device comprising:
a transfer processor that processes a transfer of a received packet accordance with a first protocol;
a sorting processor unit that sorts the received packet;
a storage unit that stores the received packet according to results of the sorting;
a converter that converts the received packet into a packet accordance with a second protocol to be transferred by the transfer processor; and
a network interface unit that makes a first proxy acknowledgment for the received packet in the storage unit and sends the first proxy acknowledgment to a source node of the received packet before a second acknowledgment for the packet is received from the destination node of the received packet.

13. The communication device according to 12, wherein the first protocol is TCP and the second protocol is UDP.

\* \* \* \* \*